(12) United States Patent
Fettig et al.

(10) Patent No.: US 9,729,806 B2
(45) Date of Patent: Aug. 8, 2017

(54) IMAGING SYSTEMS WITH PHASE DETECTION PIXELS (71) Applicant: SEMICONDUCTOR COMPONENTS INDUSTRIES, LLC, Phoenix, AZ (US)

(72) Inventors: Douglas Fettig, Meridian, ID (US); Richard Scott Johnson, Boise, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 346 days.

(21) Appl. No.: 14/590,819

(22) Filed: Jan. 6, 2015

(65) Prior Publication Data
US 2016/0198141 A1    Jul. 7, 2016

(51) Int. Cl.
*H04N 13/02* (2006.01)
*H04N 5/369* (2011.01)

(52) U.S. Cl.
CPC ....... *H04N 5/3698* (2013.01); *H04N 13/0217* (2013.01)

(58) Field of Classification Search
None
See application file for complete search history.

(56) References Cited

U.S. PATENT DOCUMENTS

| | | | |
|---|---|---|---|
| 7,557,419 B2 | 7/2009 | Gazeley | |
| 2006/0227233 A1* | 10/2006 | Fossum | H01L 27/14609 348/308 |
| 2007/0109434 A1* | 5/2007 | Puchades | H04N 3/155 348/294 |
| 2009/0115878 A1* | 5/2009 | Mauritzson | H04N 3/1512 348/307 |
| 2010/0188540 A1* | 7/2010 | Bechtel | H04N 5/378 348/302 |
| 2011/0205340 A1* | 8/2011 | Garcia | G01S 7/4972 348/46 |
| 2013/0010078 A1* | 1/2013 | Aoki | G03B 35/10 348/46 |
| 2013/0050429 A1* | 2/2013 | Suzuki | H04N 13/0271 348/46 |
| 2013/0222546 A1* | 8/2013 | Takahashi | H01L 27/14623 348/46 |
| 2014/0022354 A1* | 1/2014 | Okigawa | H04N 5/347 348/46 |
| 2014/0071244 A1* | 3/2014 | Hirota | H04N 13/0217 348/46 |

(Continued)

*Primary Examiner* — Frederick Bailey
(74) *Attorney, Agent, or Firm* — Treyz Law Group, P.C.; Joseph F. Guihan (57) ABSTRACT

An imaging device may include an image pixel array with pixels used to gather phase detection information. The pixels in the image pixel array may use a photosensitive region to generate charge during an integration period. During the integration period, certain pixels in the image pixel array may not be needed to gather phase detection information. These pixels may be electrically connected to a bias voltage supply line during the integration period so that any generated charge is drained to the bias voltage supply line. Draining charge in the unused pixels may prevent blooming that would compromise the phase detection information gathered by neighboring pixels.

18 Claims, 7 Drawing Sheets

(56) References Cited

U.S. PATENT DOCUMENTS

| | | | | |
|---|---|---|---|---|
| 2014/0198188 A1* | 7/2014 | Izawa | ................ | H04N 13/0022 |
| | | | | 348/49 |
| 2014/0246707 A1 | 9/2014 | Koo et al. | | |
| 2015/0002635 A1* | 1/2015 | Kawai | ................ | H04N 5/23212 |
| | | | | 348/46 |
| 2015/0070544 A1* | 3/2015 | Smith | ............... | H01L 27/14641 |
| | | | | 348/297 |
| 2015/0312557 A1* | 10/2015 | Kim | .................... | H04N 5/3535 |
| | | | | 348/46 |
| 2016/0028984 A1* | 1/2016 | Ganguly | .............. | H04N 5/3745 |
| | | | | 348/313 |
| 2016/0150175 A1* | 5/2016 | Hynecek | ............ | H04N 5/37452 |
| | | | | 250/208.1 |

* cited by examiner

FIG. 7

IMAGING SYSTEMS WITH PHASE DETECTION PIXELS

BACKGROUND

This relates generally to imaging systems and, more particularly, to imaging systems with phase detection capabilities.

Modern electronic devices such as cellular telephones, cameras, and computers often use digital image sensors. Imager sensors (sometimes referred to as imagers) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Some applications such as automatic focusing and three-dimensional (3D) imaging may require electronic devices to provide stereo and/or depth sensing capabilities. For example, to bring an object of interest into focus for an image capture, an electronic device may need to identify the distances between the electronic device and object of interest. To identify distances, conventional electronic devices use complex arrangements. Some arrangements require the use of multiple image sensors and camera lenses that capture images from various viewpoints. Other arrangements require the addition of lenticular arrays that focus incident light on sub-regions of a two-dimensional pixel array. Due to the addition of components such as additional image sensors or complex lens arrays, these arrangements lead to reduced spatial resolution, increased cost, and increased complexity.

It would therefore be desirable to be able to provide improved imaging systems with depth sensing capabilities.

DETAILED DESCRIPTION

Figure 1:
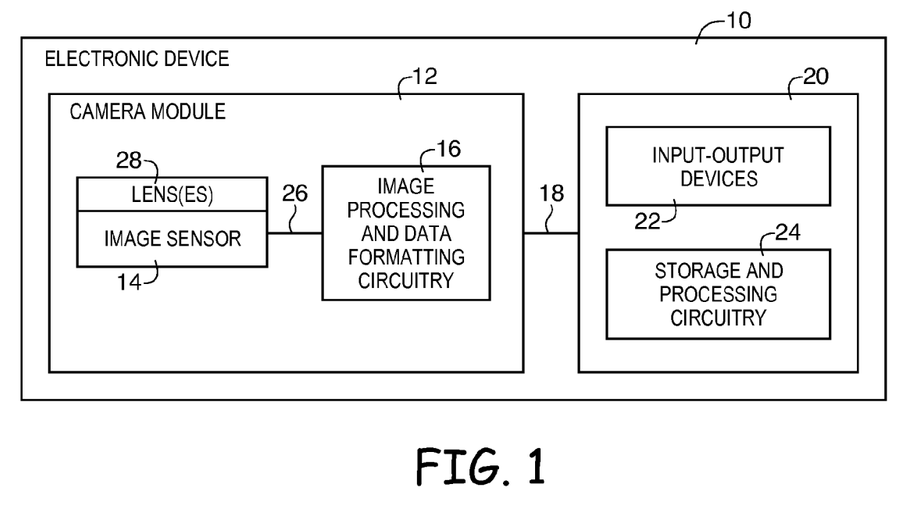
FIG. 1 is a schematic diagram of an illustrative electronic device with an image sensor that may include phase detection pixels in accordance with an embodiment of the present invention.

Embodiments of the present invention relate to image sensors with depth sensing capabilities. An electronic device with a digital camera module is shown in FIG. 1. Electronic device 10 may be a digital camera, a computer, a cellular telephone, a medical device, or other electronic device. Camera module 12 (sometimes referred to as an imaging device) may include image sensor 14 and one or more lenses 28. During operation, lenses 28 (sometimes referred to as optics 28) focus light onto image sensor 14. Image sensor 14 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16 via path 26. Image processing and data formatting circuitry 16 may be used to perform image processing functions such as automatic focusing functions, depth sensing, data formatting, adjusting white balance and exposure, implementing video image stabilization, face detection, etc. For example, during automatic focusing operations, image processing and data formatting circuitry 16 may process data gathered by phase detection pixels in image sensor 14 to determine the magnitude and direction of lens movement (e.g., movement of lens 28) needed to bring an object of interest into focus.

Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs. This is, however, merely illustrative. If desired, camera sensor 14 and image processing and data formatting circuitry 16 may be implemented using separate integrated circuits.

Camera module 12 may convey acquired image data to host subsystems 20 over path 18 (e.g., image processing and data formatting circuitry 16 may convey image data to subsystems 20). Electronic device 10 typically provides a user with numerous high-level functions. In a computer or advanced cellular telephone, for example, a user may be provided with the ability to run user applications. To implement these functions, host subsystem 20 of electronic device 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

It may be desirable to provide image sensors with depth sensing capabilities (e.g., to use in automatic focusing applications, 3D imaging applications such as machine vision applications, etc.). To provide depth sensing capabilities, image sensor 14 may include phase detection pixel groups such as pixel pair 100 shown in FIG. 2A.

Figure 2A:
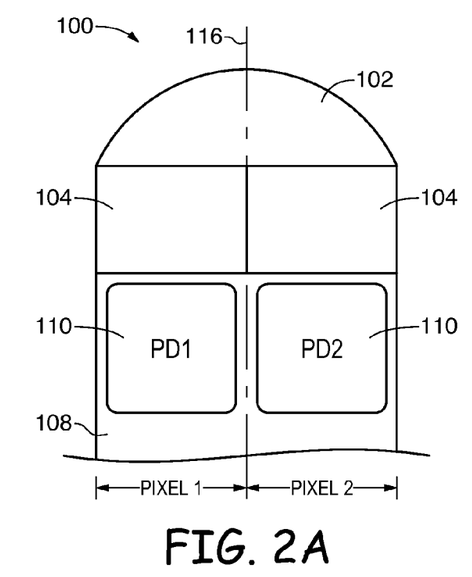
FIG. 2A is a cross-sectional view of illustrative phase detection pixels having photosensitive regions with different and asymmetric angular responses in accordance with an embodiment of the present invention.

FIG. 2A is an illustrative cross-sectional view of pixel pair 100. Pixel pair 100 may include first and second pixels such Pixel 1 and Pixel 2. Pixel 1 and Pixel 2 may include photosensitive regions such as photosensitive regions 110 formed in a substrate such as silicon substrate 108. For example, Pixel 1 may include an associated photosensitive region such as photodiode PD1, and Pixel 2 may include an associated photosensitive region such as photodiode PD2. A microlens may be formed over photodiodes PD1 and PD2 and may be used to direct incident light towards photodiodes PD1 and PD2. The arrangement of FIG. 2A in which microlens 102 covers two pixel regions may sometimes be referred to as a 2×1 or 1×2 arrangement because there are two phase detection pixels arranged consecutively in a line.

Color filters such as color filter elements 104 may be interposed between microlens 102 and substrate 108. Color filter elements 104 may filter incident light by only allowing predetermined wavelengths to pass through color filter elements 104 (e.g., color filter 104 may only be transparent to the wavelengths corresponding to a green color, a red color, a blue color, a yellow color, visible light, infrared light, etc.). Photodiodes PD1 and PD2 may serve to absorb incident light focused by microlens 102 and produce pixel signals that correspond to the amount of incident light absorbed.

Photodiodes PD1 and PD2 may each cover approximately half of the substrate area under microlens 102 (as an example). By only covering half of the substrate area, each photosensitive region may be provided with an asymmetric angular response (e.g., photodiode PD1 may produce different image signals based on the angle at which incident light reaches pixel pair 100). The angle at which incident light reaches pixel pair 100 relative to a normal axis 116 (i.e., the angle at which incident light strikes microlens 102 relative to the optical axis 116 of lens 102) may be herein referred to as the incident angle or angle of incidence.

An image sensor can be formed using front side illumination imager arrangements (e.g., when circuitry such as metal interconnect circuitry is interposed between the microlens and photosensitive regions) or back side illumination imager arrangements (e.g., when photosensitive regions are interposed between the microlens and the metal interconnect circuitry). The example of FIGS. 2A, 2B, and 2C in which pixels 1 and 2 are backside illuminated image sensor pixels is merely illustrative. If desired, pixels 1 and 2 may be front side illuminated image sensor pixels. Arrangements in which pixels are backside illuminated image sensor pixels are sometimes described herein as an example.

Figure 2B:
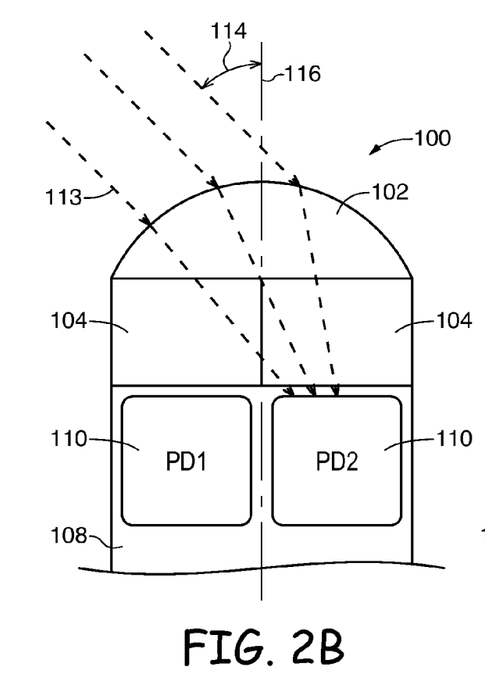
FIGS. 2B and 2C are cross-sectional views of the phase detection pixels of FIG. 2A in accordance with an embodiment of the present invention.

In the example of FIG. 2B, incident light 113 may originate from the left of normal axis 116 and may reach pixel pair 100 with an angle 114 relative to normal axis 116. Angle 114 may be a negative angle of incident light. Incident light 113 that reaches microlens 102 at a negative angle such as angle 114 may be focused towards photodiode PD2. In this scenario, photodiode PD2 may produce relatively high image signals, whereas photodiode PD1 may produce relatively low image signals (e.g., because incident light 113 is not focused towards photodiode PD1).

Figure 2C:
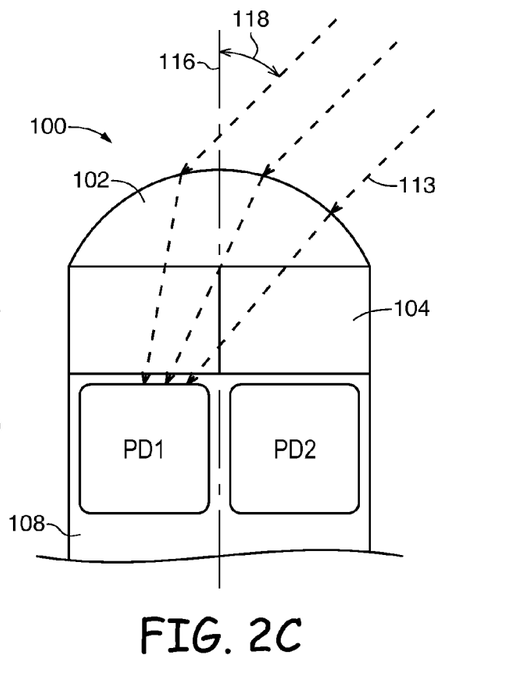

In the example of FIG. 2C, incident light 113 may originate from the right of normal axis 116 and reach pixel pair 100 with an angle 118 relative to normal axis 116. Angle 118 may be a positive angle of incident light. Incident light 113 that reaches microlens 102 at a positive angle such as angle 118 may be focused towards photodiode PD1 (e.g., the light is not focused towards photodiode PD2). In this scenario, photodiode PD2 may produce an image signal output that is relatively low, whereas photodiode PD1 may produce an image signal output that is relatively high.

Figure 3:
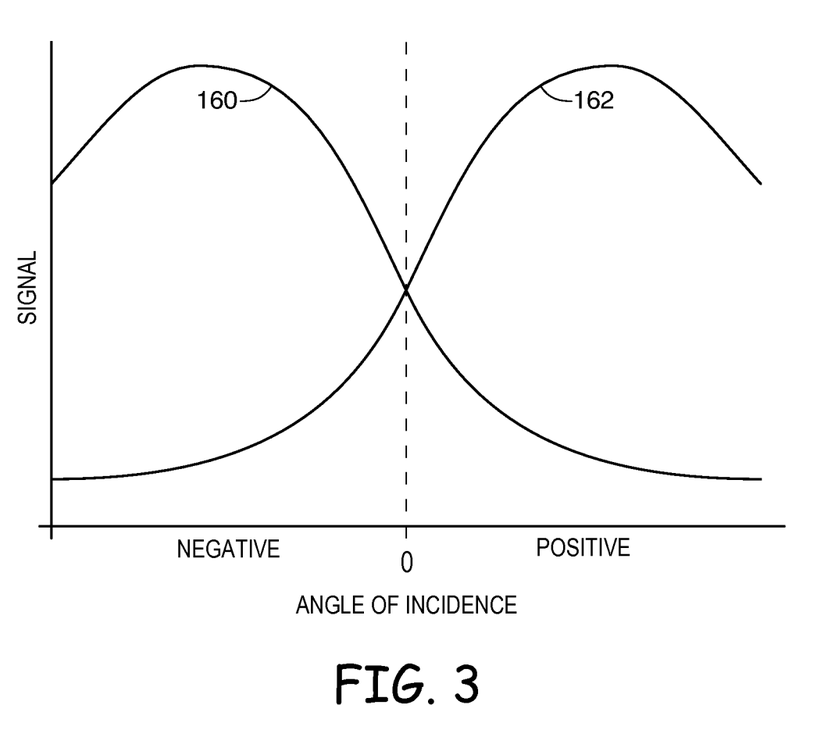
FIG. 3 is a diagram of illustrative signal outputs of photosensitive regions of depth sensing pixels for incident light striking the depth sensing pixels at varying angles of incidence in accordance with an embodiment of the present invention.

The positions of photodiodes PD1 and PD2 may sometimes be referred to as asymmetric positions because the center of each photosensitive area 110 is offset from (i.e., not aligned with) optical axis 116 of microlens 102. Due to the asymmetric formation of individual photodiodes PD1 and PD2 in substrate 108, each photosensitive area 110 may have an asymmetric angular response (e.g., the signal output produced by each photodiode 110 in response to incident light with a given intensity may vary based on an angle of incidence). In the diagram of FIG. 3, an example of the image signal outputs of photodiodes PD1 and PD2 of pixel pair 100 in response to varying angles of incident light is shown.

Line 160 may represent the output image signal for photodiode PD2 whereas line 162 may represent the output image signal for photodiode PD1. For negative angles of incidence, the output image signal for photodiode PD2 may increase (e.g., because incident light is focused onto photodiode PD2) and the output image signal for photodiode PD1 may decrease (e.g., because incident light is focused away from photodiode PD1). For positive angles of incidence, the output image signal for photodiode PD2 may be relatively small and the output image signal for photodiode PD1 may be relatively large.

The size and location of photodiodes PD1 and PD2 of pixel pair 100 of FIGS. 2A, 2B, and 2C are merely illustrative. If desired, the edges of photodiodes PD1 and PD2 may be located at the center of pixel pair 100 or may be shifted slightly away from the center of pixel pair 100 in any direction. If desired, photodiodes 110 may be decreased in size to cover less than half of the pixel area.

Output signals from pixel pairs such as pixel pair 100 may be used to adjust the optics (e.g., one or more lenses such as lenses 28 of FIG. 1) in image sensor 14 during automatic focusing operations. The direction and magnitude of lens movement needed to bring an object of interest into focus may be determined based on the output signals from pixel pairs 100.

For example, by creating pairs of pixels that are sensitive to light from one side of the lens or the other, a phase difference can be determined. This phase difference may be used to determine both how far and in which direction the image sensor optics should be adjusted to bring the object of interest into focus.

When an object is in focus, light from both sides of the image sensor optics converges to create a focused image. When an object is out of focus, the images projected by two sides of the optics do not overlap because they are out of phase with one another. By creating pairs of pixels where each pixel is sensitive to light from one side of the lens or the other, a phase difference can be determined. This phase difference can be used to determine the direction and magnitude of optics movement needed to bring the images into phase and thereby focus the object of interest. Pixel groups that are used to determine phase difference information such as pixel pair 100 are sometimes referred to herein as phase detection pixels or depth-sensing pixels.

A phase difference signal may be calculated by comparing the output pixel signal of PD1 with that of PD2. For example, a phase difference signal for pixel pair 100 may be determined by subtracting the pixel signal output of PD1 from the pixel signal output of PD2 (e.g., by subtracting line 162 from line 160). For an object at a distance that is less than the focused object distance, the phase difference signal may be negative. For an object at a distance that is greater than the focused object distance, the phase difference signal may be positive. This information may be used to automatically adjust the image sensor optics to bring the object of interest into focus (e.g., by bringing the pixel signals into phase with one another).

Figure 4A:
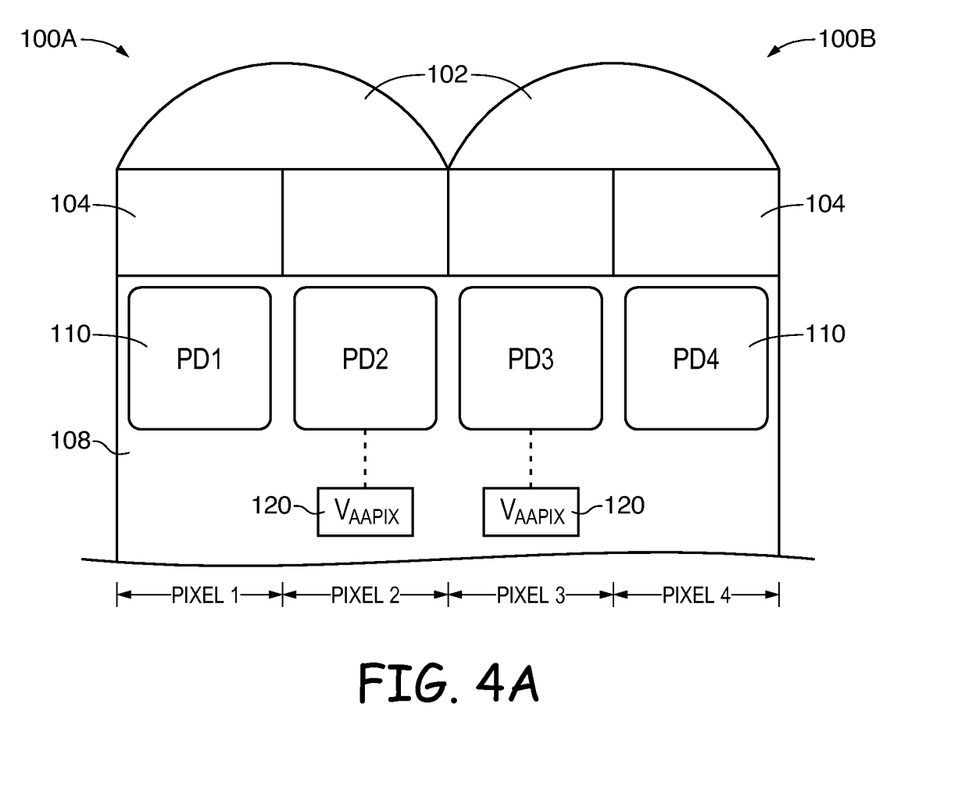
FIGS. 4A and 4B show respective cross-sectional and top views of an illustrative arrangement in which two phase detection pixel pairs are arranged consecutively in a line in accordance with an embodiment of the present invention.
Figure 4B:
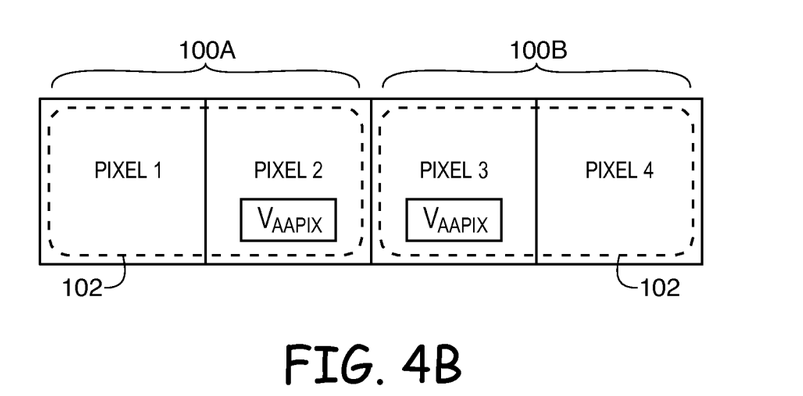

In some scenarios, it may be desirable to determine phase difference information using two or more pixel pairs that are located directly adjacent to one another. FIGS. 4A and 4B show respective cross-sectional side and top views of an illustrative arrangement in which two pixel pairs 100A and 100B are located directly adjacent to one another. As shown in FIG. 4A, each pixel pair may include first and second pixels having respective first and second photodiodes 110 covered by a single microlens 102. For example, pixel pair 100A includes Pixel 1 and Pixel 2 having respective photodiodes PD1 and PD2 covered by an associated microlens 102, and pixel pair 100B includes Pixel 3 and Pixel 4 having respective photodiodes PD3 and PD4 covered by an associated microlens 102. This type of arrangement may sometimes be referred to as a 1×4 or 4×1 arrangement because there are four phase detection pixels arranged consecutively in a line.

An arrangement of the type shown in FIG. 4A may be used in various ways. For example, pixel pairs 100A and 100B may each be used to gather phase information and the data gathered by both pairs may be averaged to increase the accuracy of the phase difference signal. With this type of configuration, pixel pair 100A may be used to determine a first phase difference signal (e.g., just as phase difference signals are determined using pixel 100 of FIG. 2A), while pixel pair 100B may be used at the same time to determine a second phase difference signal (e.g., just as phase difference signals are determined using pixel 100 of FIG. 2A). The first and second phase difference signals may be averaged to obtain a final phase difference signal (if desired).

In some scenarios, it may be desirable to determine a phase difference signal using photodiodes with a greater distance of separation from each other than that shown in FIGS. 2A, 2B, and 2C. For example, the separation distance between photodiodes PD1 and PD2 of FIG. 2A may be suitable for determining phase difference information for a given point spread function (also known as lens blur). For a different point spread function, however, it may be desirable to have a different (e.g., larger) distance between photodiodes 110.

The arrangement of FIG. 4A may be advantageous in determining phase difference information for different point spread functions. For example, phase difference information for a first point spread function may be determined using signals gathered by photodiodes PD1 and PD2 of FIG. 4A. For a second point spread function, phase difference information may be determined using signals gathered by photodiodes PD1 and PD4. For example, a phase difference signal may be calculated by subtracting the pixel signal output of PD1 from the pixel signal output of PD4. For an object at a distance that is less than the focused object distance, the phase difference signal may be negative. For an object a distance that is greater than the focused object distance, the phase difference signal may be positive. This information may be used to automatically adjust the image sensor optics to bring the object of interest into focus.

Because the separation between photodiodes PD1 and PD4 is greater than the separation between photodiodes PD1 and PD2, photodiodes PD1 and PD4 may be useful in determining phase difference information when the optical blur of the imaging system is relatively high. If desired, image processing circuitry 16 of FIG. 1 may determine which phase detection pixel data to use after the data is gathered. For example, during automatic focusing operations, phase detection pixel data may be gathered using Pixels 1, 2, 3, and 4. Image processing circuitry 16 of FIG. 1 may determine which phase detection pixel data to use (e.g., pixel data from Pixels 1 and 4 or pixel data from Pixels 1 and 2) to determine phase difference information for automatic focusing. Image processing circuitry 16 may, for example, determine which pixel data to use based on the point spread function of the imaging system. After determining which pixel data to use (e.g., after determining whether to use pixel data from PD1 and PD4 or from PD1 and PD2), image processing circuitry 16 may determine phase difference information based on that pixel data which may in turn be used to adjust the position of image sensor optics (e.g., lenses 28 of FIG. 1) to bring the object of interest into focus.

In certain embodiments, image processing circuitry 16 may determine in advance that the optical blur of the imaging system is relatively high. Consequently, the image processing circuitry may choose to use photodiodes PD1 and PD4 to determine phase difference information. In some instances, PD2 and PD3 may be operated in the same way as PD1 and PD4 to collect charge during image sampling. However, this presents the possibility for PD2 and PD3 to become saturated with charge and leak some of the collected charge onto PD1 and PD4. Instead of operating PD2 and PD3 in the same manner as PD1 and PD4, the image processing circuitry may electrically connect PD2 and PD3 to a bias voltage supply line (e.g., a bias voltage supply line that supplies a positive voltage to PD2 and PD3).

PD2 and PD3 may be connected to a bias voltage using either a layout change or a timing change. In the layout change, a bias voltage source may be provided in pixels 2 and 3 that is not present in pixels 1 and 4. In the timing change, the layout of the pixel may be the same as the surrounding pixels. However, during operation PD2 and PD3 may be tied to a supply voltage (e.g., $V_{AAPIX}$) instead of undergoing standard image sampling operations.

By coupling PD2 and PD3 to a bias voltage, image processing circuitry ensures that PD2 and PD3 will not negatively affect the phase difference information obtained by PD1 and PD4. Any charge collected in PD2 and PD3 will be drained to the bias voltage supply line, preventing blooming in PD2 and PD3.

Figure 5:
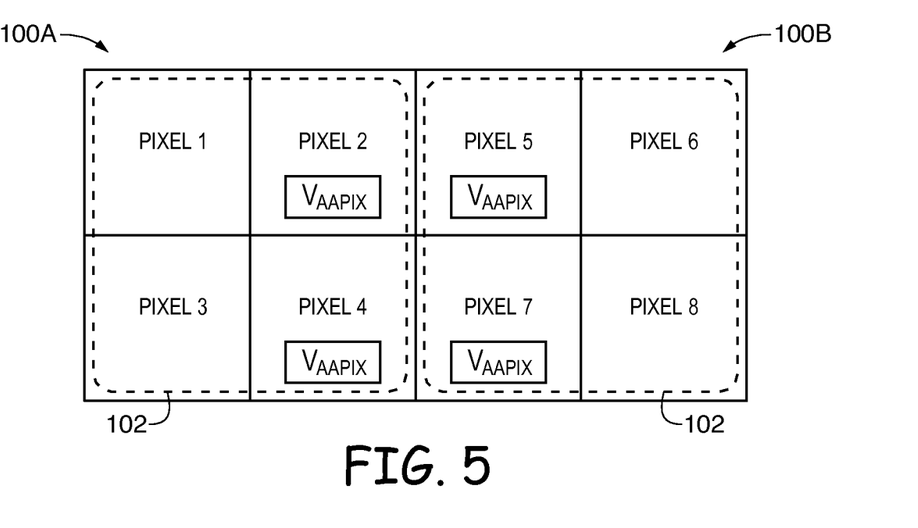
FIG. 5 shows a top view of an illustrative arrangement in which two phase detection pixel groups with four photodiodes in each group are arranged side-by-side in accordance with an embodiment of the present invention.

FIG. 5 shows a top view of an illustrative arrangement in which each microlens 102 covers four pixels in a 2×2 arrangement. With this type of configuration, phase detection pixel groups 100A and 100B each include four pixels each having an associated photodiode. For example, pixel group 100A includes pixel 1, pixel 2, pixel 3, and pixel 4, as well as corresponding PD1, PD2, PD3, and PD4. Similarly, pixel group 100B includes pixel 5, pixel 6, pixel 7, and pixel 8, as well as corresponding PD5, PD6, PD7, and PD8. Pixel groups such as pixel groups 100A and 100B having four photodiodes arranged in a 2×2 formation and covered by a single microlens may sometimes be referred to as "super pixels."

If desired, 2×2 pixel groups may be arranged consecutively in a line. FIG. 5 shows a top view of an illustrative arrangement in which two 2×2 pixel groups 100A and 100B are arranged consecutively in a line. This type of arrangement is sometimes referred to as a 2×4 or 4×2 arrangement because there are eight phase detection pixels arranged in two consecutive lines with four pixels per line.

An arrangement of the type shown in FIG. 5 may be used in various ways. For example, pixel groups 100A and 100B may each be used to gather phase information and the data gathered by the groups may be averaged to increase the accuracy of the phase difference signal.

The arrangement of FIG. 5 may be advantageous in determining phase difference information for different point spread functions. For example, phase difference information for a first point spread function may be determined using signals gathered by pixel group 100A (e.g., by summing signals from PD1 and PD3, summing signals from PD2 and PD4, and determining the difference between the two sums). For a second point spread function, phase difference information may be determined using signals gathered by pixels in groups 100A and 100B (e.g., by summing signals from PD1 and PD3, summing signals from PD6 and PD8, and determining the difference between the two sums).

If desired, image processing circuitry 16 of FIG. 1 may determine which pixel data to use for automatic focusing operations after data is gathered. For example, during automatic focusing operations, phase detection pixel data may be gathered using all phase detection pixels in groups 100A and 100B, and image processing circuitry 16 of FIG. 1 may determine which phase detection pixel data to use to determine phase difference information for automatic focusing after the data has been gathered.

In certain embodiments, image processing circuitry 16 may determine in advance that the optical blur of the imaging system is relatively high. Consequently, the image processing circuitry may choose to use photodiodes PD1, PD3, PD6, and PD8 to determine phase difference information. In some instances, the remaining pixels (e.g., PD2, PD4, PD5, and PD7) may be operated in the same way as PD1, PD3, PD6, and PD8 to gather a charge during image sampling. However, this presents the possibility for PD2, PD4, PD5, and PD7 to become saturated with charge and leak some of the gathered charge onto PD1, PD3, PD6, and PD8. Instead of operating PD2, PD4, PD5, and PD7 in the same manner as PD1, PD3, PD6, and PD8, the image processing circuitry may connect PD2, PD4, PD5, and PD7 to a bias voltage supply line (e.g., a bias voltage supply line that supplies a positive voltage to PD2, PD4, PD5, and PD7).

PD2, PD4, PD5, and PD7 may be tied to a positive voltage using either a layout change or a timing change. In the layout change, a bias voltage source may be provided in pixels 2, 4, 5, and 7 that is not present in pixels 1, 3, 6, and 8. In the timing change, the layout of the pixel may be the same as the surrounding pixels. However, during operation PD2, PD4, PD5, and PD7 may be tied to a supply voltage (e.g., $V_{AAPIX}$) instead of undergoing standard image sampling operations.

By tying PD2, PD4, PD5, and PD7 to a positive voltage, image processing circuitry ensures that PD2, PD4, PD5, and PD7 will not negatively affect the phase difference information obtained by PD1, PD3, PD6, and PD8. Any charge collected in PD2, PD4, PD5, and PD7 will be drained to the bias voltage supply line, preventing blooming in PD2, PD4, PD5, and PD7.

Figure 6A:
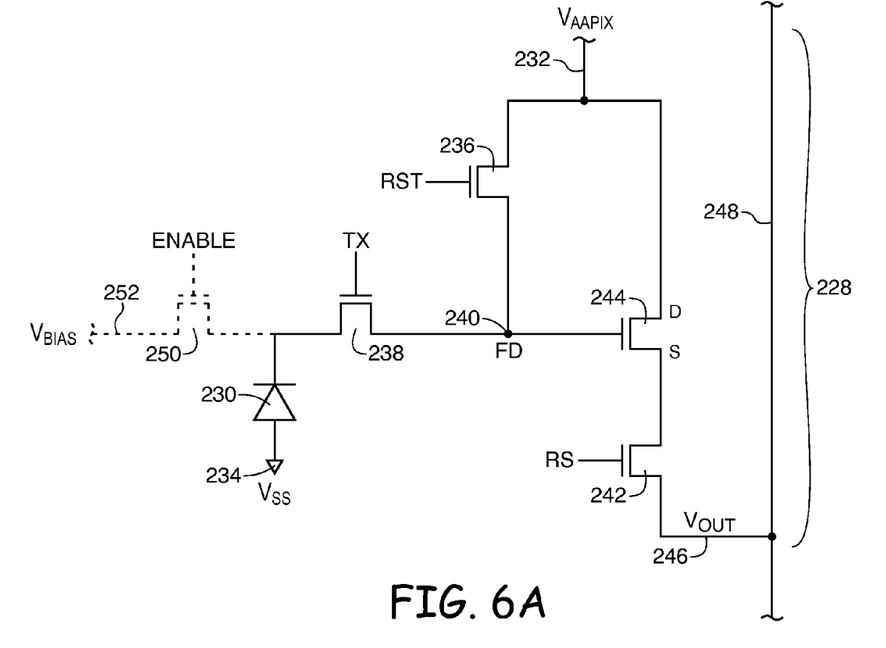
FIG. 6A is a diagram of an illustrative image sensor pixel in accordance with an embodiment of the present invention.

Circuitry in an illustrative image pixel of image sensor 14 is shown in FIG. 6. Operation of a pixel that is being used to determine phase difference information (i.e., pixel 1 and pixel 4 in FIGS. 4A and 4B) will first be described. As shown in FIG. 6, pixel 228 includes a photosensitive element such as photodiode 230. A bias voltage (e.g., voltage $V_{AAPIX}$) may be supplied to positive power supply line 232. A ground power supply voltage (e.g., $V_{SS}$) may be supplied at ground terminal 234. Incoming light is collected by photodiode 230 after passing through a color filter structure. Photodiode 230 converts the light to electrical charge.

Figure 6B:
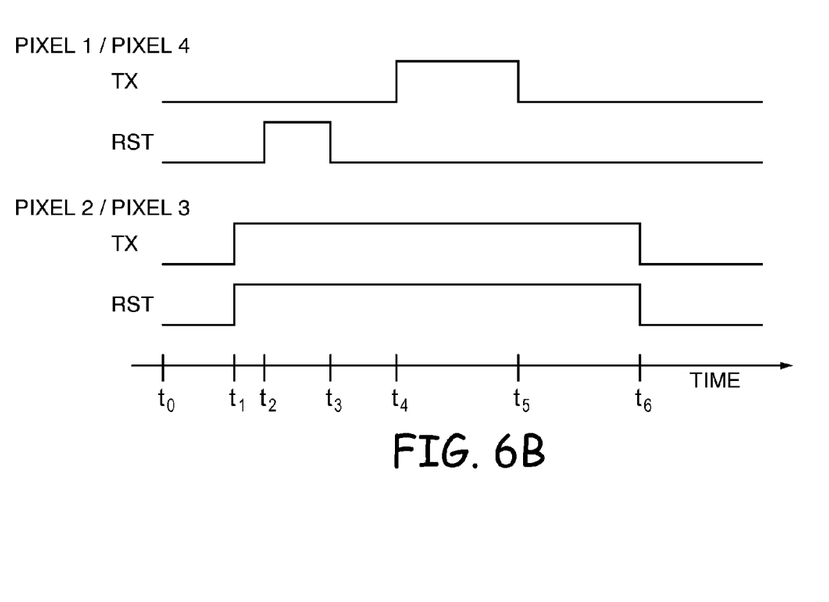
FIG. 6B is a diagram of an illustrative timing scheme for asserting various transistors in accordance with an embodiment of the present invention.

Before an image is acquired, reset control signal RST may be asserted. As shown in FIG. 6B, the reset control signal may be asserted at $t_2$. This turns on reset transistor 236 and resets charge storage node 240 (also referred to as floating diffusion FD) to $V_{AAPIX}$. The reset control signal RST may then be deasserted at time $t_3$ to turn off reset transistor 236. After the reset process is complete, transfer gate control signal TX may be asserted at time $t_4$ to turn on transfer transistor (transfer gate) 238. When transfer transistor 238 is turned on, the charge that has been generated by photodiode 230 in response to incoming light is transferred to charge storage node 240. Transfer gate control signal TX may be deasserted at time $t_5$ after the transfer in charge is complete.

Charge storage node 240 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 230. The signal associated with the stored charge on node 240 is conveyed to row select transistor 242 by source-follower transistor 244.

When it is desired to read out the value of the stored charge (i.e., the value of the stored charge that is represented by the signal at the source S of transistor 244), row select control signal RS can be asserted. When signal RS is asserted, transistor 242 turns on and a corresponding signal $V_{OUT}$ that is representative of the magnitude of the charge on charge storage node 240 is produced on output path 246. In a typical configuration, there are numerous rows and columns of pixels such as pixel 228 in the image sensor pixel array of a given image sensor. A vertical conductive path such as path 248 may be associated with each column of pixels.

When signal RS is asserted in a given row, path 248 can be used to route signal $V_{OUT}$ from that row to readout circuitry. If desired, other types of image pixel circuitry may be used to implement the image pixels of sensor 14. For example, image pixels in image sensor 14 may be three-transistor pixels, pin-photodiode pixels with four transistors each, global shutter pixels, time-of-flight pixels, etc.

Alternatively, to prevent the pixel from collecting charge, pixels such as pixels 2 and 3 from FIGS. 4A and 4B may be operated such that the respective photodiodes are electrically connected to $V_{AAPIX}$ throughout image sampling. For example, the reset control signal RST may be asserted at a time $t_1$. The transfer gate control signal TX may also be asserted at time $t_1$. When both the reset control signal RST and transfer gate control signal TX are asserted, photodiode 230 is electrically connected to supply voltage $V_{AAPIX}$. Photodiode 230 will remain electrically connected to supply voltage $V_{AAPIX}$ until the reset control signal RST and transfer gate control signal TX are deasserted at time $t_6$. Any charge collected by photodiode 230 while pixel 228 is in this state will be drained. Therefore, blooming will be prevented in photodiode 230 while pixel 228 is in this state (e.g., between $t_1$ and $t_6$). In this embodiment, the timing of the control signals for pixels 2 and 3 compared to pixels 1 and 4 is different, but the layout of the pixels is the same.

If desired, pixels such as pixels 2 and 3 from FIGS. 4A and 4B may be electrically connected to a bias voltage supply line using different pixel configuration (e.g., as opposed to using a timing change as described in connection with FIG. 6B). A pixel configuration of this type is shown by the dashed portion of FIG. 6A. Pixel 228 may include a bias voltage supply 252, or $V_{BIAS}$, (e.g., a bias voltage that may be the same as $V_{AAPIX}$ or that may be different than $V_{AAPIX}$). In these embodiments, an enable gate 250 may be provided that can connect photodiode 230 to $V_{BIAS}$ when necessary. For example, the enable gate 250 may be asserted at time $t_1$ and deasserted at time $t_6$. Any charge accumulated by photodiode 230 while pixel 228 is in this state will be drained to the bias voltage supply 252. Therefore, blooming will be prevented in photodiode 230 while pixel 228 is in this state (e.g., between $t_1$ and $t_6$).

In embodiments where a 4×2 pixel arrangement is used (e.g., FIG. 5), pixels 1, 3, 6, and 8 may operate according to the standard pixel imaging procedure described above. Pixels 2, 4, 5, and 7 may be electrically connected to a bias voltage supply such as $V_{AAPIX}$ or $V_{BIAS}$ using a timing change or a layout change as described above.

The present invention is not limited to a 4×1 or 4×2 pixel arrangement. The 4×1 arrangement could be extended to an N×1 arrangement, in which any number of pixels may be used to gather phase difference information. Any pixels not being used to gather phase difference information may be tied to a bias voltage supply such as $V_{AAPIX}$ or $V_{BIAS}$ using a timing change or a layout change as described above. Similarly, the 4×2 arrangement could be extended to an N×2 arrangement, in which any number of pixels or groups of pixels may be used to gather phase difference information. Any pixels not being used to gather phase difference information may be tied to a bias voltage such as $V_{AAPIX}$ or $V_{BIAS}$ using a timing change or a layout change as described above.

Figure 7:
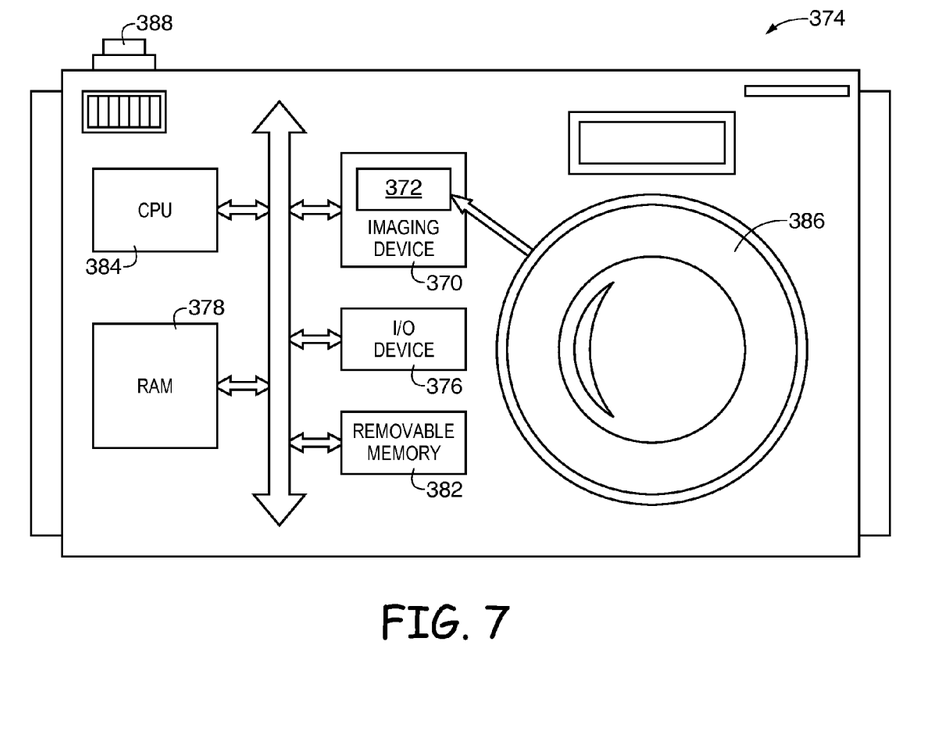
FIG. 7 shows a system employing the embodiments of FIGS. 1-6 in accordance with an embodiment of the present invention.

FIG. 7 shows in simplified form a typical processor system 374 which includes an imaging device 370. Imaging device 370 may include a pixel array 372 formed on an image sensor such as image sensor 14. Without being limiting, such processor system 374 may include a computer system, still or video camera system, scanner, machine vision, vehicle navigation, video phone, surveillance system, auto focus system, star tracker system, motion detection system, image stabilization system, and other systems employing an imaging device.

Processor system 374, which may be a digital still or video camera system, may include a lens such as lens 386 for focusing an image onto a pixel array such as pixel array 372 when shutter release button 388 is pressed. Processor system 374 may include a central processing unit such as central processing unit (CPU) 384. CPU 384 may be a microprocessor that controls camera functions and one or more image flow functions and communicates with one or more input/output (I/O) devices 376 over a bus such as bus 380. Imaging device 370 may also communicate with CPU 384 over bus 380. System 374 may include random access memory (RAM) 378 and removable memory 382. Removable memory 382 may include flash memory that communicates with CPU 384 over bus 380. Although bus 380 is illustrated as a single bus, it may be one or more buses or bridges or other communication paths used to interconnect the system components.

Various embodiments have been described illustrating an imaging device and methods of gathering image data. An image pixel array may have first, second, third, and fourth pixels arranged consecutively in a line. The second and third pixels may be interposed between the first and fourth pixels. The first and second pixels may be covered by a first microlens, while the third and fourth pixels may be covered by a second microlens. The pixels may each have a respective photosensitive region. Each photosensitive region may generate charge in response to incoming light during an integration period. During the integration period, the second and third photosensitive regions may each be electrically connected to a respective bias voltage supply line so that charge generated in the second and third photosensitive regions is drained to the respective bias voltage supply line.

The pixels may have the same pixel configurations. Each pixel may have a transfer transistor and a reset transistor interposed between the photosensitive region and the bias voltage supply line. The second and third pixels may each be electrically connected to the bias voltage supply line by asserting the respective transfer and reset transistors. The transfer transistor of the first and fourth pixels may each be deasserted throughout the integration period. The second and third pixels may each have a respective positive power supply line in addition to the respective bias voltage supply line. The first and fourth photosensitive regions may be used to gather phase detection information.

In certain embodiments of the invention, an imaging device may have an image pixel array with a first group of phase detection pixels. The first group may have first, second, third, and fourth photosensitive regions formed in a substrate and covered by a first microlens. The image pixel array may have a second group of phase detection pixels, with fifth, sixth, seventh, and eight photosensitive regions formed in a substrate and covered by a second microlens. Each photosensitive region may generate charge in response to incoming light during an integration period. Each of the second, fourth, fifth, and seventh photosensitive regions may be electrically connected to a respective bias voltage supply line during the integration period. The charge collected by the second, fourth, fifth, and seventh photosensitive regions may be drained to the bias voltage supply line during the integration period.

The first and second groups of phase detection pixels may be adjacent. The second, fourth, fifth, and seventh photosensitive regions may be interposed between the first and third photosensitive regions and the sixth and eight photosensitive regions.

The foregoing is merely illustrative of the principles of this invention and various modifications can be made by those skilled in the art without departing from the scope and spirit of the invention.

What is claimed is:

1. A method of gathering image data using an image pixel array, wherein the image pixel array has first, second, third, and fourth pixels arranged consecutively in a line, wherein the second and third pixels are interposed between the first and fourth pixels, wherein the first and second pixels are covered by a first microlens, wherein the third and fourth pixels are covered by a second microlens, wherein the first, second, third, and fourth pixels have respective first, second, third, and fourth photosensitive regions, and wherein the first, second, third, and fourth pixels have respective transfer transistors and respective reset transistors interposed between the respective photosensitive region and a respective bias voltage supply line, the method comprising:

with the first, second, third, and fourth photosensitive regions, generating charge in response to incoming light during an integration period;

during the integration period, asserting the respective transfer transistor and the respective reset transistor of the second and third pixels to electrically connect each of the second and third photosensitive regions to the respective bias voltage supply line so that charge generated in the second and third photosensitive regions is drained to the respective bias voltage supply line; and during the integration period and while asserting the respective transfer transistor and the respective reset transistor of the second and third pixels, deasserting the respective transfer transistor and the respective reset transistor of the first and fourth pixels.

2. The method defined in claim 1, wherein each of the first, second, third, and fourth pixels has a respective pixel configuration, and wherein each of the respective pixel configurations are the same.

3. The method defined in claim 1, wherein the respective transfer transistor of each of the first and fourth pixels is deasserted throughout the integration period.

4. The method defined in claim 1, further comprising using the first and fourth photosensitive regions to gather phase detection information.

5. The method defined in claim 1, further comprising:
after the integration period, reading a first pixel output signal from the first pixel and a second pixel output signal from the fourth pixel; and
calculating a phase difference signal by subtracting the first pixel output signal from the second pixel output signal.

6. The method defined in claim 1, further comprising:
determining phase difference information using only signals from the first pixel and the fourth pixel.

7. An imaging device having an image pixel array, wherein the image pixel array comprises:
first and second pixels with respective first and second photosensitive regions formed in a substrate and covered by a first microlens; and
third and fourth pixels with respective third and fourth photosensitive regions formed in the substrate and covered by a second microlens, wherein the first, second, third, and fourth pixels are arranged consecutively in a line, wherein the second and third pixels are interposed between the first and fourth pixels, wherein the first, second, third, and fourth photosensitive regions generate charge in response to incoming light during an integration period, wherein the first, second, third, and fourth pixels have respective first, second, third, and fourth bias voltage supply lines, wherein the second photosensitive region is electrically connected to the second bias voltage supply line during the integration period such that the charge generated by the second photosensitive region during the integration period is drained to the second bias voltage supply line, wherein the third photosensitive region is electrically connected to the third bias voltage supply line during the integration period such that the charge generated by the third photosensitive region during the integration period is drained to the third bias voltage supply line, and wherein the first and fourth photosensitive regions are not electrically connected to the first and fourth respective bias voltage supply lines during the integration period to allow the first and fourth photosensitive regions to accumulate charge during the integration period.

8. The imaging device defined in claim 7, wherein each of the first, second, third, and fourth pixels has a respective transfer transistor and a respective reset transistor interposed between the photosensitive region and the respective bias voltage supply line.

9. The imaging device defined in claim 8, wherein each respective transfer transistor and respective reset transistor of the second and third pixels is asserted during the integration period.

10. The imaging device defined in claim 9, wherein each respective transfer transistor and respective reset transistor of the first and fourth pixels is deasserted during the integration period.

11. The imaging device defined in claim 7, wherein each of the first, second, third, and fourth bias voltage supply lines comprises a positive power supply line.

12. The imaging device defined in claim 7, wherein each of the second and third pixels comprises a respective positive power supply line in addition to the respective bias voltage supply line.

13. An imaging device having an image pixel array, wherein the image pixel array comprises:
a first group of phase detection pixels, wherein the first group of phase detection pixels has first, second, third, and fourth photosensitive regions formed in a substrate and covered by a first microlens; and
a second group of phase detection pixels, wherein the second group of phase detection pixels has fifth, sixth, seventh, and eight photosensitive regions formed in a substrate and covered by a second microlens, wherein each photosensitive region generates charge in response to incoming light during an integration period, wherein each of the second, fourth, fifth, and seventh photosensitive regions is electrically connected to a respective bias voltage supply line during the integration period such that the charge generated by the second, fourth, fifth, and seventh photosensitive regions during the integration period is drained to the bias voltage supply line, wherein each of the first, third, sixth, and eighth pixels accumulate charge during the integration period, and wherein signal outputs from only the first, third, sixth, and eight pixels are used to determine phase detection information.

14. The imaging device defined in claim 13, wherein the first and second groups of phase detection pixels are adjacent.

15. The imaging device defined in claim 14, wherein the second, fourth, fifth, and seventh photosensitive regions are interposed between the first and third photosensitive regions and the sixth and eight photosensitive regions.

16. The imaging device defined in claim 13, wherein each of the second, fourth, fifth, and seventh photosensitive regions is connected to the respective bias voltage supply line via a respective transfer transistor and a respective reset transistor.

17. The imaging device defined in claim 16, wherein each respective transfer transistor and respective reset transistor of the second, fourth, fifth, and seventh photosensitive regions are asserted during the integration period.

18. The imaging device defined in claim 13, wherein each of the second, fourth, fifth, and seventh photosensitive regions is electrically connected to a respective positive power supply line.

* * * * *